United States Patent [19]
Avsan et al.

[11] Patent Number: 5,951,654
[45] Date of Patent: Sep. 14, 1999

[54] SYSTEM FOR PROCESSING COOPERATION SIGNALS BY STORING AND EXECUTING THE CONTROL PART OF THE SIGNAL SEPARATELY FROM THE DATA PART USING POINTER TO LINK THE TWO PARTS

[75] Inventors: Oleg Avsan, Skidbacksvägen; Klaus Wildling, Champinjonvägen; Nils Isaksson, Kvarnbergsvägen, all of Sweden

[73] Assignee: Telefonaktiebolaget LM Ericsson, Stockholm, Sweden

[21] Appl. No.: 08/817,511

[22] PCT Filed: Oct. 17, 1995

[86] PCT No.: PCT/SE95/01216

§ 371 Date: Jun. 30, 1997

§ 102(e) Date: Jun. 30, 1997

[87] PCT Pub. No.: WO96/12235

PCT Pub. Date: Apr. 25, 1996

[30] Foreign Application Priority Data

Oct. 17, 1994 [SE] Sweden ................... 9403533

[51] Int. Cl.⁶ ............... G06F 13/14; H04L 12/56
[52] U.S. Cl. ............. 710/5; 370/392; 370/412; 379/112; 379/269; 709/206; 710/52
[58] Field of Search ............... 370/392, 412; 379/112, 269; 709/206; 710/5, 52

[56] References Cited

U.S. PATENT DOCUMENTS 4,601,586 7/1986 Bahr et al. ............... 709/206
4,731,817 3/1988 Jonsson et al. ............... 379/112
4,755,986 7/1988 Hirata ............... 370/392
5,870,394 2/1999 Oprea ............... 370/392

FOREIGN PATENT DOCUMENTS 0 551 242 A2 7/1993 European Pat. Off. .
WO 85/01598 4/1985 WIPO .
WO 96/12235 4/1996 WIPO .

*Primary Examiner*—Thomas C. Lee
*Assistant Examiner*—Albert Wang
*Attorney, Agent, or Firm*—Burns, Doane, Swecker & Mathis, L.L.P.

[57] ABSTRACT

A system and a method for signal and data processing is disclosed wherein the signal format comprises at least one control information part and a data part. The system comprises a central processor system and a regional processor system with a number of regional processors. The central processor system comprises at least one execution processor and at least one signal processor. The signal processor handles the signal processing between the processor systems comprising functions blocks in a centralized manner through so-called cooperation signals wherein each input signal is stored in the form of queue buffers. Control information and data are stored in a logically connected data queue area and the control information part and a pointer are stored in a signal buffer of a signal processor and the data part is stored in a system memory or in a register memory of an execution processor. Upon execution the control information part and the pointer are transferred to the register memory of the execution processor.

21 Claims, 2 Drawing Sheets

SYSTEM FOR PROCESSING COOPERATION SIGNALS BY STORING AND EXECUTING THE CONTROL PART OF THE SIGNAL SEPARATELY FROM THE DATA PART USING POINTER TO LINK THE TWO PARTS

TECHNICAL FIELD

The present invention relates to a system and a method respectively for signal data processing wherein particularly the signals have a signal format either comprising a control information part and a data part or is such that it can be divided into a control information part and a data part.

The invention also relates to a communication system comprising a signal data processing system.

A system according to the invention among others comprises a central processor system with at least one central processor and an input/output system for communication with peripheral units. The central processor system comprises at least one central processor which at least comprises a number of function blocks whereas for example one or more regional processors are responsible for other function blocks. The cooperation between function blocks of different regional processors is controlled by the central processor system as well as the cooperation between function blocks and the central processor. This cooperation between processors is highly important for the efficiency and the capacity of a data processing system or for example a communication system.

STATE OF THE ART

In so called real-time systems the efficiency and capacity requirements are high. For example in a telecommunication systems different functions are distributed to a number of function blocks. The telecommunications system is stored-program-controlled and controlled and controlling parts respectively comprise different function blocks which are controlled by signals having giving priorities and orders. These signals, in the following denoted cooperation signals, distribute signal data of varying data length and they may have a heavy influence on the capacity of the system. The function blocks are activated by the cooperation signals and in many cases these are executed by more than one processor. It is known for example within telecommunications system comprising a central processor system as well as regional processors wherein function blocks belong to the central processor system and to the different regional processors respectively, to distribute the total traffic handling among regional and central processors. The regional processors and the central processor system then control traffic handling of different categories. The cooperation is controlled, as mentioned above, by the central processor system and cooperation between different function blocks and the central processor requires that the interprocessor cooperation between the different processors be well defined.

The Swedish document SE-A-439 208 discloses a stored-program-controlled telecommunications establishment which comprises cooperating telecommunication means. The system comprises an instruction memory and a data memory for storing of control information that is necessary for controlling the system and one or more processors which in cooperation and through stored control information control the different function blocks in real time and in the desired order. In the known system the total processor load is distributed constantly in such a way that a so called cooperation processor controls the establishment function block interprocessor cooperation. The cooperation processor has access to a cooperation memory for storing of cooperation control information. The cooperation processor distributes cooperation signals and through function blocks for job prioritizing the order for the execution of different functions is given. Through this system the cooperation possibilities between different processors were enhanced both between central, central and regional and regional and other regional processors.

However, the cooperation becomes centralized and the cooperation processor takes a part of the total processor load of the system and executes cooperation functions via the cooperation control information memory, a job and signal buffer memory.

Particularly for applications relating to telecommunications which require a lot of signalling, this means that the system capacity is enhanced. This facilitates among others the intercommunication process between different kinds of peripheral units such as for example signal terminals, in/output means, data nodes etc.

However, also in a system as described above, the cooperation signals affect the capacity of the system and particularly if the data messages are long in which case the demands are high on the system, this can be of a great importance. In the known system which is register executing all data have to go through the register memory and this may result in a bottleneck. The alternative is to make the register memory very large which however would give a slow system.

EP-A-0551242 shows a system wherein message signals are transmitted between different processors. Also in this system data go through internal processes and are sent to a register memory even if it will not be processed, which is a serious drawback.

SUMMARY OF THE INVENTION

It is an object of the invention to, in a system for signal and data handling which comprises a central processor system with at least two processors wherein the cooperation between a number of function blocks is controlled by signals, achieve that the influence on the capacity through these cooperation signals is as low as possible.

It is also an object of the invention to provide a highly efficient system and which easily can handle large amounts of signals. It is furthermore an object of the invention to provide a system and a method respectively for processing and distribution of messages with a number of accompanying signal data without the accompanying data of the signals load the processor intended for processing of the signal or the signals internally in the data processing system or for transmission thereof to different peripheral units, from a capacity point of view. Particularly it is an object of the present invention to provide for signal processing of large amounts of signals with signal data belonging thereto in, from a capacity point of view, very efficient way without therefor producing too severe the requirements on buffering and registering functions of the system. It is thus an object of the invention that the data of the signals do not unnecessarily load the system at the same time as the data shall be easy accessible for processing when so desired or required.

It is also an object of the invention to provide a method for signal and data processing wherein the objects of the method for processing of signal data are the same as the objects of the system which were mentioned above.

Particularly it is according to one embodiment of the invention an object of the invention to provide a communications system, more particularly a telecommunications system or a data communications system in which the given objects are achieved.

These as well as other objects are achieved through a system and a method respectively as initially referred to wherein the central processor system comprises at least one so called job processor or execution processor and a signal processor or a cooperation processor. The signal handling between the function blocks is then controlled by the central signal processor through cooperation signals and every incoming signal is stored in the form of a buffer queue in a buffer memory. The control information part of the signal is stored in a buffer memory in the signal processor together with a pointer and the data part of the signal is stored in a common system memory for the system or in the register memory. The control information part is transferred to the register memory of the execution processor for execution. This means that data accompanying the signals will not, from a capacity point of view, load the processor which is to process the signal or the signals either for internal use within the system or for transmission to the peripheral units given by the destinations.

According to the invention all incoming signals may particularly be stored in the form of queue buffers for signals for example from the regional processors in an execution and signal buffer memory and the control information part and the data part of the signals are stored in a logically connected dataqueue area. This dataqueue area may at processing of signal data be seen as an extension of the internal process register of the data processor. In a physical aspect a signal data area with data information is formed in the system memory of the processor. The control information part is accompanied to said area by a pointer which according to one embodiment is taken from a free queue list or similar. The pointer follows the control information part so that the data belonging to the control information part of the signal will be accessible. According to a particular embodiment, when an instruction resulting in a signal transmission is given, the control information part is fetched from the register memory and then the pointer is used for fetching signal data from the existing signal data area of the system memory (or the register memory).

According to an advantageous embodiment of the invention data transports to and from an advantageously common system memory for the processors are done with the use of so called direct memory access technique (DMA). Memory accesses may according to an advantageous embodiment be stolen via so called cycle stealings without affecting any memory activities going on parallelly in the processors.

The present invention makes it possible to process large amounts of signals with signal data belonging thereto in an efficient way and still keep the requirements relating to size and time on an acceptable level for the functions required in execution, signal buffer memories and register memories of the execution processors. Normally the control information part is processed whereas the data part itself is passive. But if and when the data part requires processing in the register memory of the concerned execution processor, it is closely associated thereto and easy accessible. Advantageously the invention makes use of the fact that the signal format is such that it comprises a control information part and a data part, both at signal reception, signal processing and signal transmission. The signal format may be of an arbitrary length or size, both as far as the control information part as the data part are concerned.

The invention also relates to a communications system, for example a telecommunications system or a data communications system comprising a system for processing of signal data as described above. For telecommunication applications and data communication applications requiring a lot of signalling, it is advantageous that, apart from the central controlling, also a considerable increase in system capacity is provided and it provides a rational and efficient intercommunication process between different peripheral units.

It is e.g. an advantage of the present invention that the register memory is not unnecessarily loaded by data which is not actually processed.

BRIEF DESCRIPTION OF THE DRAWINGS

The invention will in the following be further described in a non-limiting way under reference to the accompanying drawings in which.

DETAILED DESCRIPTION OF THE INVENTION

Figure 1:
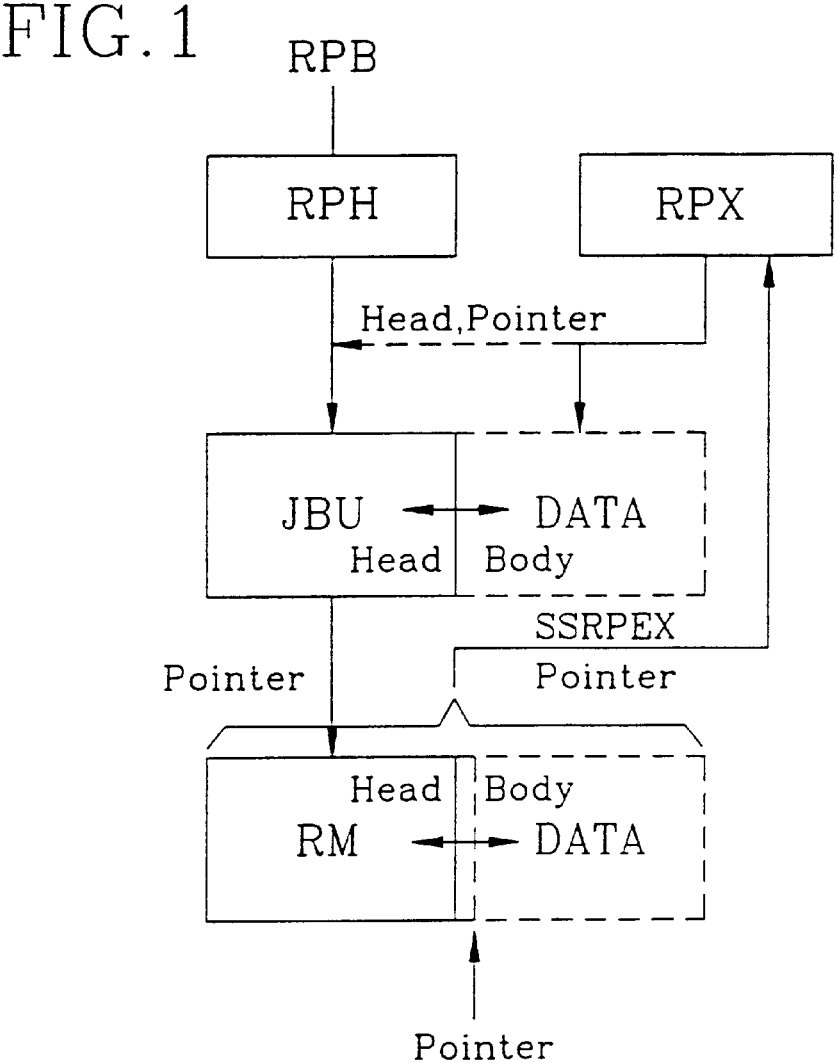
FIG. 1 illustrates an example on logical signal data processing.
Figure 2:
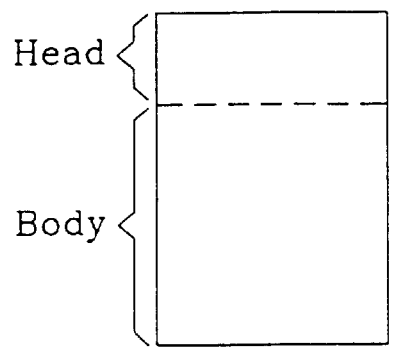
FIG. 2 illustrates an example on a divided signal format.

A stored-program-controlled system according to one embodiment of the invention comprises a number of regional processors RP and a central processor system comprising at least two processors. In FIG. 1 is schematically illustrated one example of logical signal handling. Signals are incoming from regional processors (not shown in FIG. 1) with the assistance of a regional processor buss RPB to a regional processor handler RPH. For example via standard links signals are incoming to RPX, which illustrates protocol X from some peripheral unit (not shown). The control information part HEAD together with a pointer for the incoming signal are stored in the job and signal buffer memory JBU in the form of signal queue buffers. The signal format is arbitrary and both the control information part and the data part may have an arbitrary length or size. In FIG. 2 a format is illustrated comprising a control information part HEAD and a data part BODY. The illustrated example is naturally also applicable to the other types of data transmission signals for which it is possible to divide a signal for example into a control information part and a data part respectively. The control information part HEAD and the data part BODY are stored in the logically connected data queue area. As signal data is processed, the data queue area may according to one embodiment be seen as an extension of the internal process register RM of the job executing processor. Physically seen is according to one embodiment a signal data area formed in the system memory SM of the central processor unit which is central or distributed (se particularly FIG. 3). In the embodiment shown in FIG. 1 the data part is stored in an extension of the register memory RM of the execution processor IPU. In FIG. 1 are thus the logical relationships illustrated. When a job is waiting in the job queue to be processed, the control information part HEAD is in the buffer memory JBU of the signal processor SPU and the data part BODY logically forms an extension of the buffer memory JBU.

When this job then is to be executed, the control information part HEAD is transferred to the register memory RM of the execution processor and the data part then logically forms an extension of the register memory RM.

The physical location of the data part BODY may either be in the system memory SM or in an extended register memory RM. Pointers are obtained from a free queue list and this must follow the control information part HEAD so that the data belonging to the signal can be reached. For a signal transmission controlled by an instruction SSRPEX, the control information part HEAD is fetched from the register memory RM and through utilization of the pointer, the signal data is fetched from the signal data area of the system memory SM or alternatively the register memory RM of the execution processor. According to an advantageous embodiment data transports to and from the system memory of central processor system SM or the register memory RM are carried out by a direct memory access DMA which is known per se. The memory accesses may then be stolen, so called cycle stealings, without disturbing memory activities going on parallelly in the job executing processor(s).

Figure 3:
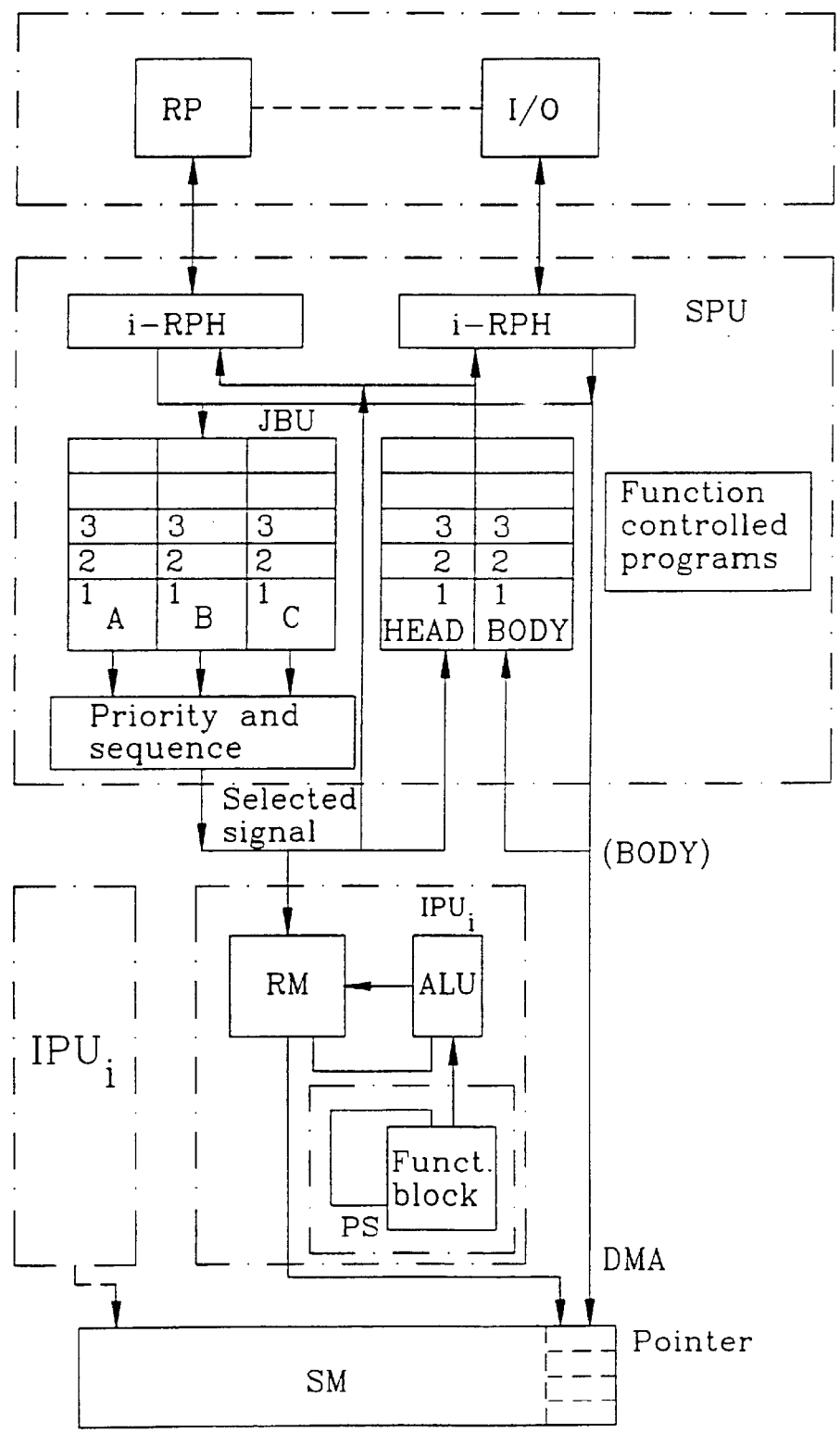
FIG. 3 illustrates an example on a system for processing of signal data according to the invention wherein the data part is stored in a system memory.

In FIG. 3 the system for processing of signal data is described more in detail. Signal communication with regional processors RP takes place via interface circuits comprising protocol handlers of so called regional processors handlers i-RPH. Such units operate independently handling signals to and from regional processors RP and generally they can handle a number of regional processors. The regional processor handlers RPH can access the central buss of the central processor system and they can among others address the memory SM of the central processor themselves. Also other peripheral system units can via an input/output system I/O communicate with protocol handlers i-RPH. Incoming signals are thus handled by a signal distributing system which comprises a signal processor or a dedicated processor SPU. The signal distributing system includes the above mentioned protocol handlers i-RPH which form interface circuits.

The interprocessor cooperation itself can for example be carried out essentially in agreement with what is given in SE-B-439 208. According to this document the regional processors cooperate with each other through an independent stored-program-controlled cooperation signal distribution system. According to the cooperation process itself requests and message transfer are carried out between different regional processors. Incoming cooperation signals from the regional processors are arranged in order of priority or in different priority levels by the signal distribution system. To be able to prioritize in this manner, the function block of the cooperation signal distribution system must be able to understand the incoming messages. If for example different regional processors use different standards, the signal distribution system conveniently adapts an incoming signal to the desired standard, according to an advantageous embodiment to the standard of the called processor. According to another advantageous embodiment function blocks can be arranged for sorting the regional processors into categories which particularly may depend o n the current multiprocessor organization. This can be done in any desired manner, for example so that all processors can call each other or that only some of the them can call certain other processors etc. Alternatively can only a central processor receive calls from a regional processor or no regional processors can call each other etc.

The signal processor SPU communicates, as referred to above, with peripheral processors, for example regional processors RP or similar via interface-protocol handlers i-RPH which are adapted to the interprocessor communication as desired in the system. The s e interface-protocol handlers i-RPH may for example contain intermediate buffers (not shown) for speed adaptation or for adaption between different standards of regional processors and/or central processors. According to an advantageous embodiment are all regional processors duplicated and cooperate according to a load sharing principle but this does not affect the present invention and will therefore not be further described here.

For processing of signals the signal processor SPU initiates one or more executing processors $IPU_1$, $IPU_2$, . . . for every signal relating to function block execution. (Every central processor comprises a number of function blocks each of which has been assigned as specific function). According to the shown example all traffic controlling data processing is done with temporary data in internal process registers RM of the job execution processors $IPU_i$. As temporary data is considered signal data transferred by the signal processor SPU to the process register RM of the executing processor IPU, which data thus are directly accessible for processing.

The signal processor SPU and thus also the signal distribution system comprises so called job and signal buffers JBU which advantageously comprise so called FIFO-register (first in-first out) which are arranged for the different priority levels A,B,C. In the illustrated example the incoming signal is supposed to be of the type as described above, namely comprising a control information part HEAD and a data part BODY. The control information part HEAD is in the shown example stored together with a stack pointer in a given priority level after the signal data part BODY has been buffered in the signal system memory SM which e.g. may be common within the central processor system. The variables of the system are stored in the system memory SM. Signal data BODY can here advantageously be stored in an area structure and according to a particular embodiment the system memory SM is equipped with so called direct memory access DMA. Buffered signals stored in job buffer blocks JBU are dealt with in the priority and sequential order as given by the job buffers of the signal processors and they are distributed to the appropriate job executing processor $IPU_1$. Thus signal transmissions are activated by a job executing processor $IPU_1$ with an instruction but they are carried out by the signal processor SPU. In the illustrated embodiment the control information part HEAD of the signal is fetched from the buffer memory JBU in the signal processor SPU for execution. The data part BODY of the signal is fetched from the system memory SM. According to an alternative embodiment the data part BODY can be stored in the register memory RM of the execution processor $IPU_1$ as described in the foregoing. The addressing of the data part takes place with using the pointer of the signal which was buffered in job buffer (buffer memory) JBU together with the control information part HEAD as also mentioned above.

According to advantageous embodiment outgoing signal data can be buffered intermediately (not shown here) for, when there is a need, taking internal time differences into account before transmission to peripheral system units or regional processors RP. This means of course that a standard adaptation can be done before transmission in a way which corresponds to what was disclosed above in relation to incoming signals. A job execution processor IPU may, in a manner known per se, in addition to a register memory also comprise a data processing unit ALU, and then in a program stores PS store a number of function blocks. It may also comprise so called reference memories (not shown here).

The system according to the invention may comprise a substantially arbitrary number of regional processors and a number of central processor units wherein every central processor unit comprises at least one signal processor SPU and a job executing processor IPU. Of course, alternatively one or more signal (signal cooperation) processors SPU and a number of job execution processors IPU$_1$ belonging thereto can be provided.

According to a particular embodiment the system is applied in a system for telecommunication or for datacommunication. According to another particular embodiment the system is particularly used within ISDN-communication (Integrated Services Digital Network).

The telecommunication system can e.g. be the so called AXE-system (by LM Ericsson) which comprises a switching part and a control part. This control part comprises among others a regional processor sub-system and a central processor sub-system and a number input/output systems (I/O). The processor comprises a number of function blocks each assigned a specific function. The regional processor system and the central processor system respectively particularly comprise a system as disclosed by the present invention.

According to one embodiment, which however merely is given for exemplifying reasons, the signal format may be according to CCITT (ITU-T) signalling system no. 7 etc. in which case the control information part HEAD for example comprises 16 bytes and the data part for example 256 bytes. However, as already referred to above, any signal format can be used.

The invention is of course not limited to the shown embodiments but it can be varied in a number of ways within the scope of the claims.

We claim:

1. System for signal and data processing comprising a central processor system comprising at least two processors (SPU, IPU), and at least one regional processor (RP) wherein the central processor system comprises a number of function blocks, signal handling to and from for example a regional processor (RP) being handled by a signal handling system (RPH) of the central processor system and wherein one of the processors of the central processor system comprises a cooperation processor or a signal processor (SPU) wherein the signal handling between the function blocks is controlled by the central signal processor (SPU) through cooperation signals, characterized in, that each signal comprises a control information part (HEAD) and a data part (BODY) and in that for every incoming signal the control information part (HEAD) is stored in a buffer memory (JBU) of the signal processor (SPU) together with a pointer whereas the data part (BODY) is stored in another memory (SM;RM) and in that upon execution the control information part (HEAD) stored in the buffer memory and the pointer are transferred to the register memory (RM) of the execution processor (IPU) whereas the data part (BODY) only is fetched if it is to be processed and in that the data part (BODY) then can be easily accessed for processing in the register memory (RM) of the execution processor (IPU) so that unnecessary transportations of data are avoided.

2. System according to claim 1, characterized in, that the part (BODY) is stored in a system memory (SM).

3. System according to claim 1, characterized in, that the data part (BODY) is stored in the register memory (RM) of an execution processor (IPU) or in a logical extension thereof.

4. System according to claim 2, characterized in, that the data part (BODY) of a signal is fetched from the system memory (SM) by the control information part (HEAD) and the stack pointer accompanying the control information part (HEAD) or alternatively from the logical extension of the register memory (RM) if stored therein.

5. System according to claim 1, characterized in, that direct memory access technique (DMA) is used for transporting data to and from the system memory (SM).

6. System according to claim 1, characterized in, that the signal processor (SPU) via interface protocol handlers (i-RPH) communicates with peripheral units or for example regional processors (RP).

7. System according to claim 6, characterized in, that the interface protocol handlers (i-RPH) are provided with an intermediate storage for adapting the speed between the units.

8. System according to claim 1, characterized in, that the signal processor (SPU) initiates an execution processor (IPU) for a signal relating to function block execution.

9. System according to claim 1, characterized in, that the signal processor (SPU) initiates more than one execution processor (IPU) for a function block execution signal.

10. System according to claim 1, characterized in, that signal data being transferred from the signal processor (SPU) to a register memory (RM) of an executing processor (IPU) form temporary data directly accessible for processing.

11. System according to claim 1, characterized in, that the cooperation processor (SPU) comprises job and signal buffers (JBU) which are arranged in priority levels (A,B,C).

12. System according to claim 11, characterized in, that the job and signal buffers comprise FIFO-registers (first in/first out).

13. System according to claim 12, characterized in, that the control information part (HEAD) is stored in a given priority level (A,B,C) after storing of the data part (BODY) in the system memory (SM) or in the register memory (RM) of the execution processor.

14. System according to claim 1, characterized in, that signal transmissions are activated by an execution processor (IPU) with an instruction and in that signal transmissions are carried out by the cooperation processor (SPU).

15. System according to anyone of the preceding claims, characterized in, that output signal data is buffered for adaptation of internal time differences at output to peripheral units.

16. System according to claim 1, characterized in, that it comprises more than one execution processor (IPU$_1$, IPU$_2$).

17. System according to claim 1, characterized in, that it is comprised by a communications system and in that the format of the signals are given by the signalling system 7 (SS 7).

18. Method for signal and data processing in a control computer system with a central processor system comprising at least two processors (SPU, IPU) and a regional processor system comprising at least one regional processor (RP) wherein the signal processor (SPU) of the central processor system controls the handling of signals between different function blocks comprised by the central processor system via cooperation signals, the signals being divided into a control information part (HEAD) and a data part (BODY), characterized in, that each incoming signal is stored as a queue buffer in a buffer memory (JBU) of the signal processor (SPU) in such a way that:

the control information part of the signal (HEAD) together with a pointer are stored in the buffer memory (JBU) of the signal processor (SPU), the data part (BODY) of the signal is stored separately in a memory (SM;RM), at execution the control information part (HEAD) and the pointer are transferred to the register memory (RM) of an execution processor (IPU), and in that the data part (BODY) only is fetched when it is to be processed in the register memory (RM) of the execution processor so that unnecessary transportations of data are avoided.

19. Method according to claim 18, characterized in, that the data part (BODY) is stored in a system memory (SM).

20. Method according to claim 19, characterized in, that the data part (BODY) is stored in the register memory (RM) of the execution processor (IPU).

21. Stored-program-controlled communication system comprising a switching part and a control part, the control part comprising a number of function blocks assigned given functions wherein the system comprises a central processor system comprising at least two processors (SPU, IPU), an input/output system (I/O) and a regional processor system comprising a number of regional processors (RP) wherein signal processing between the regional processor system and the central processor system is handled by means for handling regional processors (RPH), wherein at least one of the processors of the central processor system comprises a signal processor (SPU) which cooperates with one or more execution processors (IPU$_i$) through cooperation signals wherein the cooperation signals are controlled by the signal processor (SPU), characterized in, that each signal is stored as a queue buffer in a buffer memory of the signal processor (SPU) and in that the control information part (HEAD) of a divided signal is stored in a signal buffer memory (JBU) of a signal processor (SPU) together with a pointer and in that the data part of the signal (BODY) is stored in a system memory (SM) or in an extension of the register memory (RM) of the execution processor (IPU$_i$) and wherein the control information part (HEAD) upon execution is transferred to the register memory (RM) of the execution processor (IPU) and wherein the data part is easily accessible for execution in the register memory of the execution processor (IPU$_i$) and in that it is only fetched when it is to be processed and otherwise is passive.

* * * * *